United States Patent [19]

Frame

[11] 4,293,442

[45] * Oct. 6, 1981

[54] CATALYTIC COMPOSITE, METHOD OF MANUFACTURE, AND PROCESS FOR USE

[75] Inventor: Robert R. Frame, Glenview, Ill.

[73] Assignee: UOP Inc., Des Plaines, Ill.

[ * ] Notice: The portion of the term of this patent subsequent to Feb. 10, 1998, has been disclaimed.

[21] Appl. No.: 65,673

[22] Filed: Aug. 10, 1979

[51] Int. Cl.$^3$ .............................................. B01J 31/22
[52] U.S. Cl. ............................... 252/428; 252/431 C; 252/431 N; 252/430; 208/206; 208/207
[58] Field of Search ............... 252/428, 431 N, 431 C, 252/430

[56] References Cited

U.S. PATENT DOCUMENTS

| | | | |
|---|---|---|---|
| 2,988,500 | 6/1961 | Gleim et al. | 252/431 N X |
| 3,108,081 | 10/1963 | Gleim et al. | 252/431 N X |
| 3,692,842 | 9/1973 | Massie | 252/431 N X |
| 4,124,493 | 11/1978 | Frame | 252/431 N X |

*Primary Examiner*—Patrick Garvin

*Attorney, Agent, or Firm*—James R. Hoatson, Jr.; Thomas K. McBride; William H. Page, II

[57] ABSTRACT

A supported metal chelate catalyst, a method of preparing said catalyst, and a process of using said catalyst is disclosed. The catalyst is particularly useful in the treatment of a sour petroleum distillate or fraction to remove mercaptans contained therein. In preparing the catalyst, a solid adsorptive support is contacted with a solution of a metal chelate. The resulting composite is thereafter contacted at an elevated temperature with a substituted ammonium compound.

In one embodiment, the metal chelate, cobalt phthalocyanine monosulfonate, is contacted with the adsorptive support, activated charcoal, raised to a temperature of about 100° C., and then contacted with the substituted ammonium compound, dimethylbenzylalkylammonium chloride. In another embodiment, the catalyst of the invention can be contacted with a mercaptan-containing petroleum distillate in admixture with an oxidizing agent and an alkaline solution to convert the mercaptans to innocuous disulfide.

19 Claims, 1 Drawing Figure

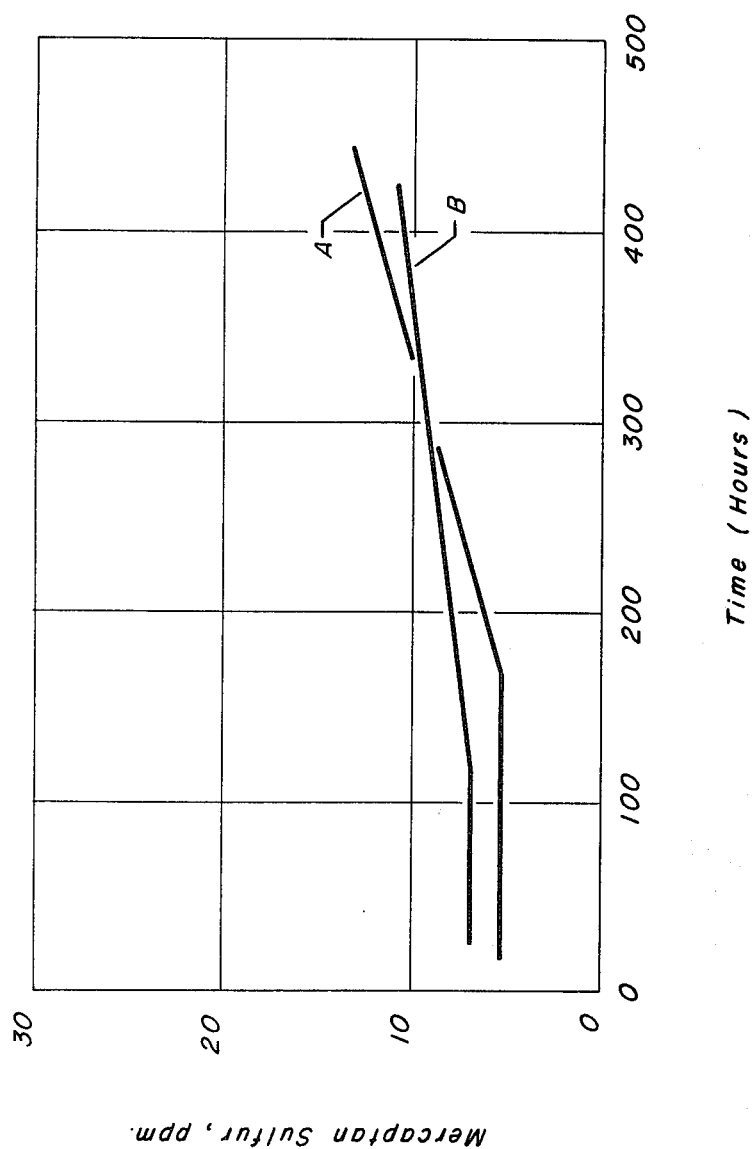

CATALYTIC COMPOSITE, METHOD OF MANUFACTURE, AND PROCESS FOR USE

BACKGROUND OF THE INVENTION

1. Field of the Invention

The field of art to which the claimed invention pertains is catalytic composites particularly useful in the treatment of sour petroleum distillates or fractions, the treatment being commonly referred to as sweetening. More specifically, the claimed invention relates to catalytic composites prepared by sequentially contacting a solid adsorptive support with first a metal chelate solution and thereafter, at an elevated temperature, a substituted ammonium compound.

2. Description of the Prior Art

Processes for the treatment of a sour petroleum distillate, wherein said distillate is passed in contact with a supported metal phthalocyanine catalyst disposed as a fixed bed in a treating or reaction zone, have become well known and widely accepted in the industry. The treating process is typically designed to effect the catalytic oxidation of offensive mercaptans contained in the sour petroleum distillate with the formation of innocuous disulfides. The oxidizing agent is most often air admixed with the sour petroleum distillate to be treated. Gasoline, including natural, straight run and cracked gasolines, is the most frequently treated sour petroleum distillate. Other sour petroleum distillates include the normally gaseous petroleum fraction as well as naphtha, kerosine, jet fuel, fuel oil, lube oil, and the like.

In the manufacture of a supported metal phthalocyanine catalyst, it is the practice to adsorb the metal phthalocyanine on an adsorptive support from a solution and/or dispersion thereof. Alcoholic solutions and/or dispersions, and in particular methanolic solutions, have provided an active catalyst composite, and alcoholic solutions and/or dispersions are commonly employed in the preparation of supported metal phthalocyanine catalysts used throughout the industry in the sweetening of sour petroleum distillates. Aqueous solutions also have been used, but heretofore such solutions have afforded a relatively poor distribution of the metal phthalocyanine on the adsorptive support, and quality control is difficult to achieve. The result has been a catalyst composite of lower activity.

The prior art suggests two ways to improve the oxidation of mercaptans contained in sour petroleum distillates. One way is by increasing the activity of the catalyst by the addition of specified additives to the metal phthalocyanine solutions employed in preparing the catalytic composites. The prior art suggests that to increase the activity of catalytic composites produced with aqueous solutions a strong base, such as ammonia or ammonium hydroxide, be included in the solution (U.S. Pat. No. 3,108,081). The base apparently improves the solubility of the metal phthalocyanine. The prior art also discloses that a higher activity catalytic composite results from the use of a soluble acid amide instead of a strong base (U.S. Pat. No. 4,098,681). A catalytic composite of improved activity has also been found to result from the inclusion of a carboxylic acid in a metal phthalocyanine solution of water (U.S. Pat. No. 4,087,378) or an alcohol (U.S. Pat. No. 4,107,078). Other additives to the metal phthalocyanine solution which have been disclosed as providing a catalytic composite of higher activity are polynuclear aromatic sulfonic acid (U.S. Pat. No. 4,124,531) and morpholine (U.S. Pat. No. 4,142,964).

Alternatively to the modification of the metal phthalocyanine catalytic composite by the inclusion with the metal phthalocyanine solution of the additives identified above, the prior art discloses that the improved oxidation of mercaptans contained in some petroleum distillates can be effected by use of additives in the distillate treating process. U.S. Pat. No. 4,124,493 discloses a process for treating a mercaptan-containing sour petroleum distillate, and in particular a distillate boiling at a temperature in excess of 135° C., which comprises contacting said distillate with a supported mercaptan oxidation catalyst at oxidation conditions in the presence of an alkaline reagent and a specified substituted ammonium halide. Metal phthalocyanines were disclosed as a preferred class of mercaptan oxidation catalyst.

Thus, the prior art discloses that additives may be added to the catalyst precursors in the production of the catalyst, or, alternatively, that additives may be added to the distillate to be treated with the catalyst. In either method considerable molar excess of the additive must be used to produce a stable catalyst or to effectively treat the distillate. However, it is generally desired to minimize the amount of additive in the treated distillate, since additives can degrade the quality of the distillate.

SUMMARY OF THE INVENTION

It is a broad objective of my invention to produce a novel catalyst of increased activity and stability compared with catalyst produced utilizing the same precursors by prior art methods.

Another objective is to provide a process for treating a mercaptan-containing petroleum distillate in which said novel catalyst is used.

In brief summary, I have found that a catalyst especially useful in the treatment of sour petroleum distillates or fractions may be prepared by contacting a solid adsorptive support with a solution of a metal chelate and thereafter contacting the resulting composite at a temperature elevated with respect to ambient temperature with a substituted ammonium compound represented by the structural formula

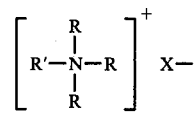

wherein R is a hydrocarbon radical containing up to about 20 carbon atoms and selected from the group consisting of alkyl, cycloalkyl, aryl, alkaryl and aralkyl, R' is a substantially straight-chain alkyl radical containing from about 5 to about 20 carbon atoms, and X is an anion selected from the group consisting of halide, nitrate, nitrite, sulfate, phosphate, acetate, citrate, tartrate and hyroxide.

Another embodiment of the invention is to contact a solid adsorptive support with a solution of a metal chelate, heat the resulting composite, and thereafter contact the composite with the substituted ammonium compound.

One of the preferred embodiments of the invention is to contact an activated charcoal adsorptive support with a cobalt phthalocyanine disulfonate solution, heat the resulting composite to between about 80° C. and about 120° C., and thereafter contact the composite with a dimethylbenzylalkylammonium chloride.

Another of the preferred embodiments of the invention is to contact a mercaptan-containing sour petroleum distillate with the catalytic composite of this invention in the presence of an alkaline reagent at oxidation conditions.

One of the more specific preferred embodiments of the invention is to contact in the presence of an alkaline reagent at oxidation conditions a mercaptan-containing sour petroleum distillate with a catalytic composite prepared as set forth above by contacting an activated charcoal support with a cobalt phthalocyanine disulfonate solution, heating the resulting composite to between about 80° C. and above 120° C., and thereafter contacting the composite with a dimethylbenzylalkylammonium chloride.

Other objects and embodiments will become apparent in the following detailed description.

The attached drawing is a graphic representation of the results obtained in the examples.

DESCRIPTION OF THE INVENTION

The solid adsorbent supports herein contemplated include the various and well-known solid adsorbent materials in general use as catalyst supports. Preferred adsorbent materials include the various charcoals produced by the destructive distillation of wood, peat, lignite, nut shells, bones, and other carbonaceous matter, and preferably such charcoals as have been heat treated, or chemically treated, or both, to form a highly porous particle structure of increased adsorbent capacity, and generally defined as activated charcoal. Said adsorbent materials also include the naturally occurring clays and silicates, for example, diatomaceous earth, fullers earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof, like silica-alumina, silica-zirconia, alumina-zirconia, etc. Any particular solid adsorbent material is selected with regard to its stability under conditions of its intended use. For example, in the treatment of a sour petroleum distillate, the solid adsorbent material should be insoluble in, and otherwise inert to, the petroleum distillate at alkaline conditions typically existing in the treating zone. Charcoal, and particularly activated charcoal, is preferred because of its capacity for metal phthalocyanine and because of its stability under treating conditions. However, it should be observed that the method of this invention is also applicable to the preparation of a metal chelate composited with any of the other well-known solid adsorbent materials, particularly the refractory inorganic oxides.

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g., cobalt tetrapyridinoporphyrazine; porphyrin and metalloporphyrin catalysts as described in U.S. Pat. No. 2,966,453, e.g., cobalt corrin sulfonate; chelate organometallic catalysts such as described in U.S. Pat. No. 2,918,426, e.g., the condensation product of an aminophenol and a metal of Group VIII; and the like. It is particularly preferred that metal phthalocyanines be used in the practice of the present invention.

The metal phthalocyanines which can be employed to catalyze the oxidation of mercaptans contained in sour petroleum distillates generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate or a mixture thereof being particularly preferred. The sulfonated derivatives may be prepared, for example, by reacting cobalt, vanadium, or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The substituted ammonium compound, represented by the structural formula shown above, is preferably a substituted ammonium halide. Suitable substituted ammonium halides are described in U.S. Pat. No. 4,124,493. The particularly preferred substituted ammonium halide is a dimethylbenzylalkylammonium chloride.

The preferred dimethylbenzylalkylammonium chlorides can be prepared by initially reacting ammonia and a $C_{12}$–$C_{18}$ carboxylic acid in contact with silica gel at about 500° C. to form a $C_{12}$–$C_{18}$ nitrile. The nitrile is then reduced with hydrogen in contact with a nickel catalyst at about 140° C. The resulting $C_{12}$–$C_{18}$ amine is separated from the reaction mixture and reacted with a 2 molar excess of methyl chloride. After neutralization of the reaction mixture, the amine is further reacted with 1 mole equivalent of benzylchloride to yield the desired dimethylbenzylalkylammonium chloride. The methyl chloride, as well as the benzylchloride, is suitably reacted with the amine in methanolic solution at a temperature of about 150° C. The product can be used as is or further treated over activated charcoal to remove impurities.

As stated above, the method of this invention comprises contacting a solid adsorptive support with a metal chelate and thereafter contacting at an elevated temperature the resulting composite with a substituted ammonium compound. The metal chelate can be contacted with the solid adsorptive support in any conventional or otherwise convenient manner. In general, the support or carrier material in the form of spheres, pills, pellets, granules or other particles of uniform or irregular shape and size, can be dipped, soaked, suspended or otherwise immersed in an aqueous or alcoholic solution and/or dispersion of the metal chelate, or the aqueous or alcoholic solution and/or dispersion may be sprayed onto, poured over, or otherwise contacted with the adsorbent support. Thereafter, the substituted ammonium compound can be contacted with the resulting composite at an elevated temperature in any conventional or otherwise convenient manner. Such contacting can be accomplished by dipping, soaking, suspending, or otherwise immersing the support in the substituted ammonium compound or a solution thereof, or the substituted ammonium compound or solution thereof may be sprayed onto, poured over, or otherwise contacted with the support. The second contacting step must be accomplished at an elevated temperature, preferably in the range of from about 50° C. to about 200° C. and most preferably in the range of 80° C. to about 120° C. The elevated temperature apparently facilitates the proper adsorption or impregnation of the substituted ammonium compound on the composite resulting from the first contacting step. The elevated temperature can be effected in any conventional or otherwise convenient manner. A particularly convenient manner of effecting the elevated temperature is steam heating in a rotary evaporator the composite resulting from the first contacting step prior to effecting the second contacting step. Alternatively, the substituted ammonium compound can be heated prior to the second contacting step to effect the second contacting step at an elevated temperature. The large volume of composite resulting from the first contacting step relative to the required volume of the substituted ammonium compound makes this alternative less attractive. However, heat may be applied either to the composite resulting from the first contacting step, to the substituted ammonium compound, or to both. Heat may be applied immediately prior to or during the second contacting step. It is preferred that heat be applied to the composite resulting from the first contacting step, and that heat continue to be applied during the second contacting step. Finally, the solution or dispersion may be separated and the catalytic product allowed to dry at ambient temperature conditions or at an elevated temperature in an oven or in a flow of hot gases, or in any other suitable manner.

In a sweetening process in which the subject catalytic composite would be used, offensive mercaptans contained in a sour petroleum distillate are oxidized to form innocuous disulfides in the presence of an alkaline reagent. The catalytic composite would be initially saturated with the alkaline reagent, and the alkaline reagent thereafter admixed, at least intermittently, with the sour petroleum distillate passed in contact with the catalytic composite to maintain a desired alkaline reagent concentration thereon. While any suitable alkaline reagent may be employed, an alkali metal hydroxide in aqueous solution, for example, an aqueous solution of sodium hydroxide, potassium hydroxide, etc., is preferred. The solution may further comprise a solubilizer to promote mercaptan solubility, for example alcohol, and especially methanol, ethanol, n-propanol, isopropanol, etc., and also phenols, cresols, and the like. A particularly preferred alkaline reagent is a caustic solution comprising from about 2 to about 30 wt. % sodium hydroxide. The solubilizer, when employed, is preferably methanol, and the alkaline solution may suitably comprise from about 2 to about 100 volume % thereof. While sodium hydroxide and potassium hydroxide constitute the preferred alkaline reagents, others including lithium hydroxide, rubidium hydroxide and cesium hydroxide, are also suitably employed.

The sweetening process is usually effected at ambient temperature conditions, although elevated temperatures not in excess of about 150° C. may be used. The process may be effected at a pressure of up to about 1000 psig., or more, although atmospheric, or substantially atmospheric, pressures are entirely suitable. Contact times equivalent to a liquid hourly space velocity of from about 1 to about 100 or more are effective to achieve a desired reduction in the mercaptan content of a sour petroleum distillate, an optimum contact time being dependent on the size of the treating zone, the quantity of catalyst contained therein and the sour petroleum distillates being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing agents may be employed. In fixed bed operations, the mixture of petroleum distillate, alkaline reagent and oxidizing agent is passed upwardly or downwardly through the catalyst bed. In some cases, the air may be passed countercurrent to the petroleum distillate. In still other cases, the petroleum distillate and alkaline reagent may be introduced separately into the treating zone.

In many cases, the sour petroleum distillate and especially gasoline, is first treated with an alkaline reagent solution in order to extract a major portion of the mercaptan prior to further treating in the manner herein described. Any suitable alkaline reagent, and particularly sodium hydroxide or potassium hydroxide in aqueous solution, is utilized. This removes a major portion of the mercaptans but leaves a distillate which is still sour. Further conversion of the mercaptans is effected in the presence of the catalytic composite herein described.

The catalytic composite prepared in accordance with the method of this invention is both active and stable. Accordingly, the catalytic composite may be employed in a fixed bed for the treatment of large volumes of sour petroleum distillate. Although the metal chelate may be somewhat soluble in alkaline solution, it is nevertheless retained on the solid adsorbent support. However, in the event that any of the metal chelate is leached from the support, or otherwise carried away in the alkaline solution, it may be readily recycled in said solution for reuse in the sweetening process.

As previously stated, the prior art suggests that catalyst activity with respect to the oxidation of mercaptans in sour petroleum distillates can be increased by the addition of certain additives to the metal phthalocyanine solutions employed in preparing catalytic composites. The prior art has disclosed that in the case of many additives stable catalyst can be produced only if a large quantity of the additive relative to the metal phthalocyanine is used. However, the prior art also discloses that use of large quantities of the additive, besides being uneconomical may result in a catalyst which tends to release additive to the petroleum distillate being treated. Such additives may be undesirable in treated petroleum distillate for various reasons, including a tendency to decrease the thermal stability of the distillate or products made therefrom containing such additive, and a tendency to increase the propensity of the distillate to retain water. In contrast to catalysts produced by prior art methods, catalyst produced by the method of this invention can be manufactured with lower relative amounts of additive to attain a desired degree of stability, and therefore are expected to pose less of a risk of contamination of the stock to be treated.

The following examples are presented in illustration of certain preferred embodiments of this invention and are not intended as an undue limitation on the generally broad scope of the invention as set out in the appended claims.

EXAMPLE I

This example is the control example, by which a catalytic composite was prepared using a conventional method. In this example, 0.75 grams of monosulfonated cobalt phthalocyanine were dissolved in a solution of 185 cc water and 15 cc isopropanol, the resulting solution thereafter placed in a rotary evaporator, and 250 cc of Norit charcoal was added. The Norit charcoal particles of this and the subsequent example has an apparent bulk density of about 0.25 grams per cubic centimeter and a particle size in the 10×30 mesh range. The mixture was rolled in the rotary evaporator at room temperature for 15 minutes. A solution of 1.25 grams of dimethylbenzyl-n-alkylammonium chloride in 100 cc of water was added to the rotary evaporator. The dimethylbenzyl-n-alkylammonium chloride comprise dimethylbenzyldodecylammonium chloride (61%); dimethylbenzyltetradecylammonium chloride (23%), dimethylbenzylhexadecylammonium chloride (11%); dimethylbenzyloctadecylammonium chloride (5%). The resulting mixture was rolled at room temperature for 45 minutes, and then rolled under steam heat at 100° C. for three hours to remove solvents.

EXAMPLE II

This example illustrates one embodiment of this invention. The mixture of charcoal and a solution of monosulfonated cobalt phthalocyanine, water and isopropanol, was prepared substantially as described in Example I. In this example, the mixture was then rolled at room temperature for a total time of one hour. Thereafter, 75 cc of water was added to the mixture, rolling was resumed and steam heat at 100° C. was immediately begun. The mixture was steam heated and rolled for ten minutes. A solution of 1.25 grams of dimethylbenzyl-n-alkylammonium chloride in 25 cc of water was added to the rotary evaporator. The resulting mixture was then rolled under steam heat at 100° C. for 2 hours and 50 minutes to remove solvents.

EXAMPLE III

A comparative evaluation of the catalytic composites of the foregoing Example I and Example II was effected in the following manner. The example illustrates another embodiment of this invention. In each case, 100 cc of the catalytic composite was loaded into a vertical tubular glass reactor. The beds of catalytic composite were washed with 10 cc of 8% sodium hydroxide at 12 hour intervals during the tests. Air was admixed with a sour kerosine feedstock to provide about 1.5 times the needed amount to oxidize the mercaptan content of the feedstock, and the mixture was processed through the catalytic composite bed at a 0.5 liquid hourly space velocity over a 450–500 hour period. The kerosine feedstock contained 505 ppm mercaptan sulfur. The reactor effluent was monitored and analyzed at six hour intervals for mercaptan sulfur.

The results are compared in the drawing attached. The drawing clearly illustrates the improved activity stability exhibited by the catalytic composites of this invention. The improved activity stability is conducive to longer catalyst life. In the drawing, the line labeled "A" represents the results following from the use as described in Example III of a catalytic composite prepared in accordance with the method described in Example I. The line labeled "B" represents the results following from the use as described in Example III of a catalytic composite prepared in accordance with the method described in Example II. While catalytic composites prepared in accordance with the method of this invention may be initially less active than catalysts prepared in the conventional manner, the improved activity stability characteristics of the catalytic composites of this invention outweigh that initial advantage over the course of the test period.

I claim as my invention:

1. A method of preparing a supported metal chelate catalyst which comprises contacting a solid adsorptive support with a solution of a metal chelate, and thereafter contacting the resulting composite at a temperature between about 50°–200° C. with a substituted ammonium compound represented by the structural formula

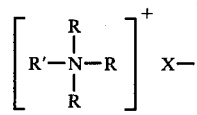

where R is a hydrocarbon radical containing up to about 20 carbon atoms and selected from the group consisting of alkyl, cycloalkyl, aryl, alkaryl and aralkyl, R' is a substantially straight-chain alkyl radical containing from about 5 to about 20 carbon atoms, and X is an anion selected from the group consisting of halide, nitrate, nitrite, sulfate, phosphate, acetate, citrate, tartrate and hyroxide.

2. The method of claim 1 wherein said composite is heated to said temperature and is thereafter contacted with said substituted ammonium compound.

3. The method of claim 1 wherein said adsorptive support is an activated charcoal.

4. The method of claim 3 wherein said temperature is between about 80° C. and about 120° C.

5. The method of claim 1 wherein said metal chelate is a metal phthalocyanine.

6. The method of claim 5 wherein said temperature is between about 80° C. and about 120° C.

7. The method of claim 5 wherein said metal phthalocyanine is a cobalt phthalocyanine.

8. The method of claim 5 wherein said metal phthalocyanine is a cobalt phthalocyanine sulfonate.

9. The method of claim 5 wherein said metal phthalocyanine is a cobalt phthalocyanine disulfonate.

10. The method of claim 5 wherein said metal phthalocyanine is a cobalt phthalocyanine carboxylate.

11. The method of claim 5 wherein said metal phthalocyanine is a vanadium phthalocyanine.

12. The method of claim 5 wherein said substituted ammonium compound is a substituted ammonium halide.

13. The method of claim 5 wherein said substituted ammonium compound is a dimethylbenzylalkylammonium chloride.

14. The method of claim 13 wherein said metal phthalocyanine is a cobalt phthalocyanine sulfonate and said temperature is between about 80° C. and about 120° C.

15. A catalytic composite manufactured by the method of claim 1.

16. A catalytic composite manufactured by the method of claim 4.

17. A catalytic composite manufactured by the method of claim 6.

18. A catalytic composite manufactured by the method of claim 12.

19. A catalytic composite manufactured by the method of claim 13 wherein said elevated temperature is between about 80° C. and about 120° C. and said metal phthalocyanine is a cobalt phthalocyanine sulfonate.

* * * * *

Disclaimer 4,293,442.—*Robert R. Frame*, Glenview, Ill. CATALYTIC COMPOSITE, METHOD OF MANUFACTURE, AND PROCESS FOR USE. Patent dated Oct. 6, 1981. Disclaimer filed Sept. 28, 1981, by the assignee, *UPO, Inc.*

Hereby enters this disclaimer to claims 16, 18, 19, 20 and 91 of said patent.

[*Official Gazette December 22, 1981.*]